Sept. 13, 1927.

K. IMHOFF 1,642,206

APPARATUS FOR SEWAGE TREATMENT BY ACTIVATED SLUDGE IN
COMBINATION WITH SLUDGE DIGESTION

Filed Aug. 25, 1924

Witnesses:

Inventor:
Karl Imhoff

Patented Sept. 13, 1927.

1,642,206

UNITED STATES PATENT OFFICE.

KARL IMHOFF, OF ESSEN, GERMANY.

APPARATUS FOR SEWAGE TREATMENT BY ACTIVATED SLUDGE IN COMBINATION WITH SLUDGE DIGESTION.

Application filed August 25, 1924. Serial No. 734,012.

This invention relates to an improved apparatus for sewage treatment by activated sludge in combination with sludge digestion, in which the sludge from the setting basin is automatically supplied into the aeration tank as well as into the digestion chamber forming parts of the apparatus.

Figure 1:
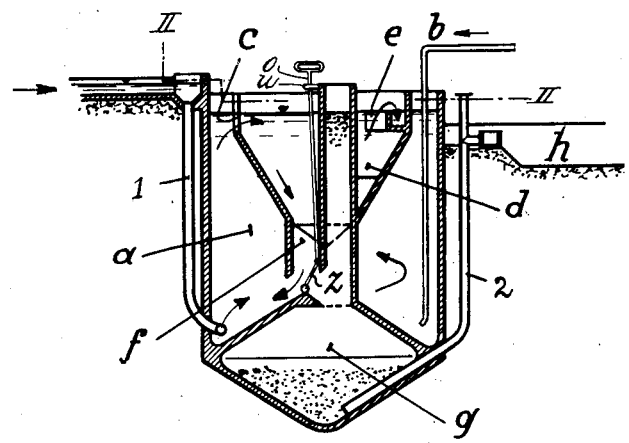

The accompanying drawing shows the improved apparatus diagammatically in a preferred form of its construction: Fig. 1 being a vertical section on the line I—I of Fig. 2 which is a horizontal section on the line II—II of Fig. 1.

Figure 2:
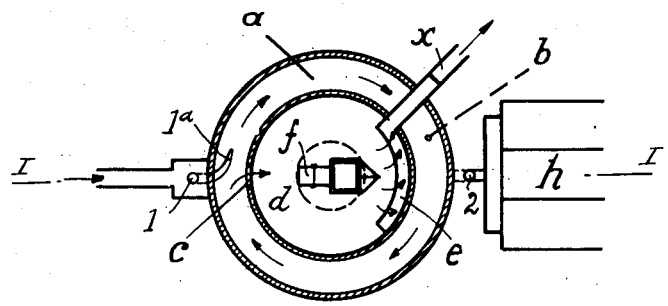

$a$ designates an aeration tank, in which the sewage incoming at the bottom thereof is set in circulation as indicated by the arrows therein shown in Fig. 2 for preventing sludge settling at the bottom and for keeping the same in permanent suspension. The circulation of the sewage is produced by the supply pipe terminating at the bottom of the aeration tank in tangential direction to the cylindrical outer wall of the latter. The required jetlike action of the incoming sewage is produced by the water level in front of the supply pipe 1 lying higher than that in the aeration tank (as shown in Fig. 1) and by the lower tangentially directed extremity $1^a$ of the supply pipe 1 being narrowed (as shown in Fig. 2). Through the air pipe $b$ as much compressed air only is supplied as is necessary for keeping the microorganisms in the sewage alive. The sewage then ascends slowly in circulatory motion and finally passes at $c$ into the funnel-shaped settling basin $d$ arranged within and concentrically to said aeration tank. There, the sludge is eliminated while the purified effluent escapes over the overflow channel $e$ through the outlet pipe $x$. The sludge settled in the settling basin $d$ falls down the channel $f$ in which a closure, for instance an adjustable flap $z$, is provided, which can be operated from outside by means of an upwardly extending linked hand-lever $o$ guided at its upper end in a fixed lug $u$ and, adapted to so adjust said flap that said channel is connected either with the aeration tank $a$ or/and with the sludge digestion chamber $g$ underneath. Upon the flap $z$ shutting-off the admission to the sludge digestion chamber $g$, the sludge flows uninterruptedly and automatically back to the aeration tank $a$ where it participates again in the circulatory motion therein. If it is, however, desired to diminish the quantity of the sludge in the sewage, the flap $z$ is so adjusted for some time that it shuts-off the admission to the aeration tank and liberates that to the sludge digestion chamber. By a corresponding intermediary position of the flap $z$, it is also possible to attain that continuously a positive portion of the sludge flows for its re-employment into the aeration tank while another excess portion of the sludge passes into the sludge digestion chamber. A sludge pipe 2 serves to draw-off from time to time the sludge from the sludge digestion chamber onto the drying bed $h$.

What I claim, is:

Apparatus for sewage treatment by activated sludge in combination with sludge digestion, comprising an aeration tank designed to permit a circulatory motion of the sewage therein, a settling basin within said aeration tank, a sludge digestion chamber located underneath said settling basin, a passage-way in the bottom of said settling basin establishing communication with the aeration tank and the digestion chamber, and means adapted to direct sludge from the settling basin into the aeration tank or into the digestion chamber.

In testimony whereof I have hereunto set my hand.

KARL IMHOFF.